Figure 1:
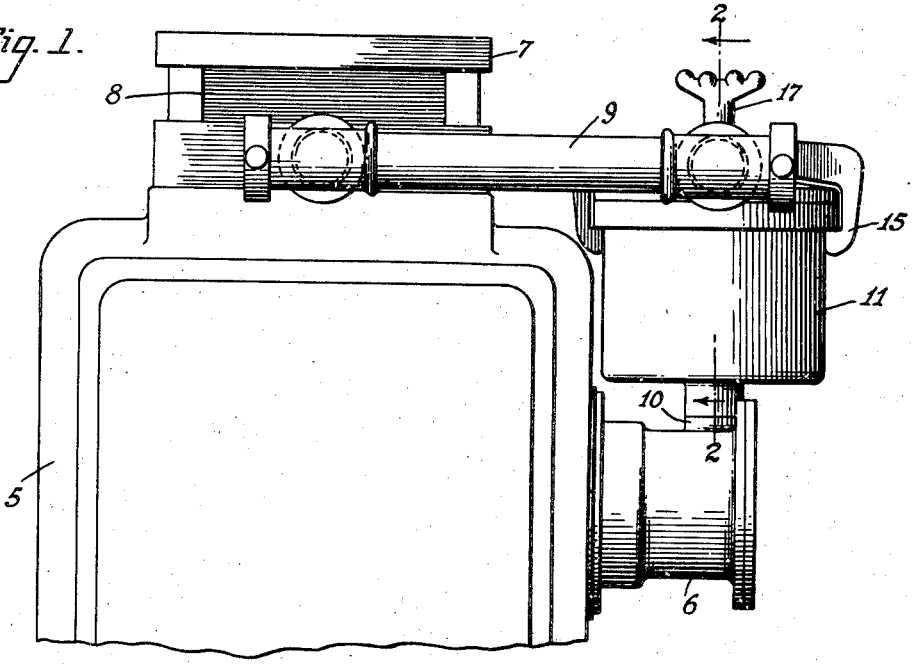

Sept. 21, 1948.  M. A. GOLDMAN  2,449,809
CORRUGATED DISK FILTER
Original Filed Jan. 12, 1939  2 Sheets-Sheet 1

INVENTOR.
MAURICE A. GOLDMAN
BY George H Lorch

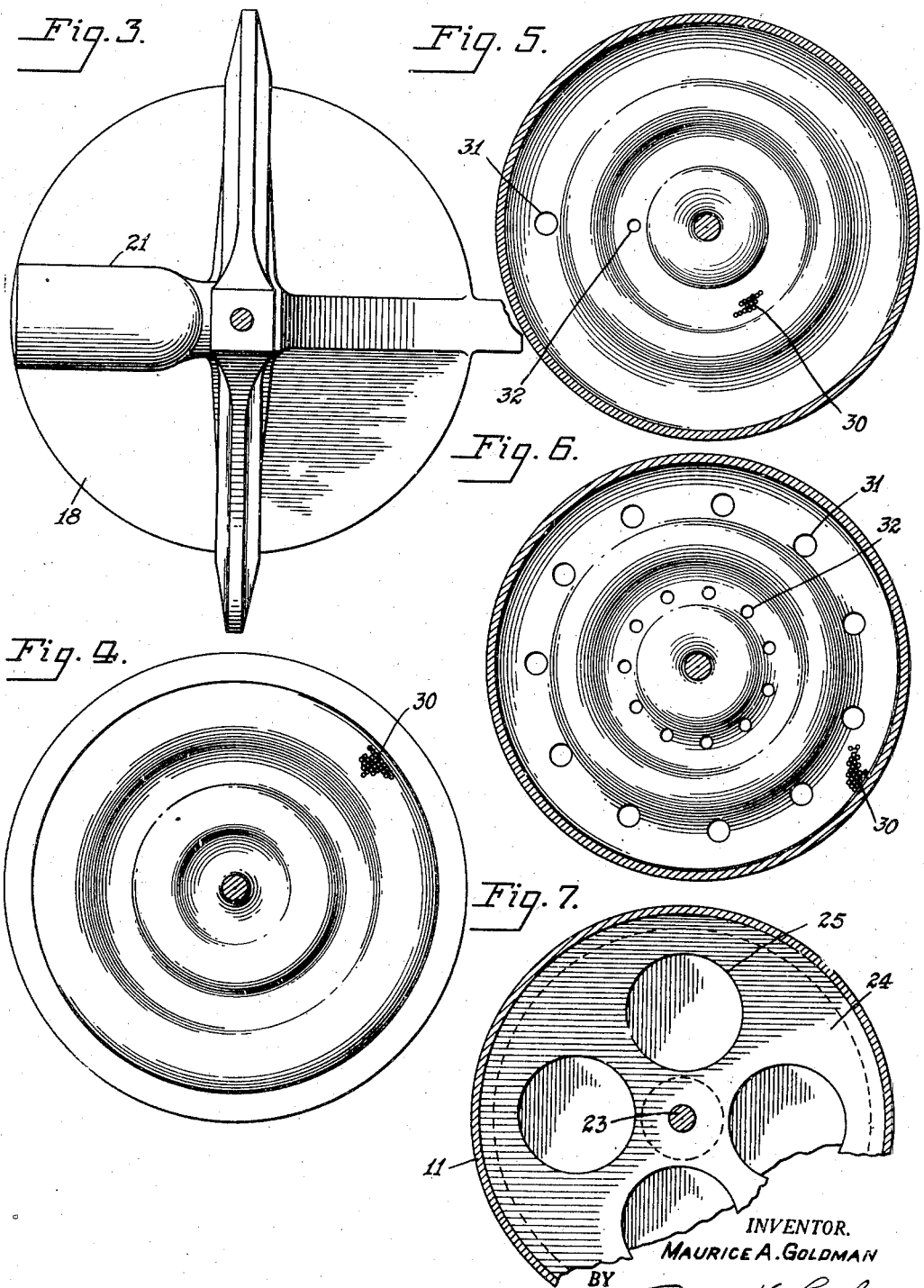

Patented Sept. 21, 1948

2,449,809

UNITED STATES PATENT OFFICE 2,449,809

CORRUGATED DISK FILTER

Maurice A. Goldman, New Brunswick, N. J., assignor to Johnson & Johnson, New Brunswick, N. J., a corporation of New Jersey Original application January 12, 1939, Serial No. 250,666. Divided and this application October 24, 1942, Serial No. 463,159

3 Claims. (Cl. 210—169)

This invention relates to filtration systems and has marked utility when reduced to practice in the cold filtration of milk. Generally stated it is a division of the invention disclosed in my copending application Serial No. 250,666, filed January 12, 1939 (now abandoned) and comprehends the apparatus and the trapping mechanism used in the method disclosed and claimed in my prior application. By means of this method and apparatus it is possible to filter milk at a temperature of about 40° F. at standard plant operating capacities and in such a way as to obtain milk of excellent quality and flavor and free from included dirt and other sources of contamination. One such contamination is a bacterial growth which when present forms a slimy deposit on the filter septa and is generally and loosely termed garget by the farmer. Such deposits contribute greatly to the mechanical breakdown of filtering systems. It is a fact cognizable to experts that pasteurization does not kill all bacteria and that presence of the slimy deposit or the phlegm-like secretion or discharge associated with garget or mastitis generally results in stringy or ropy milk. The present invention is meritorious in that it provides also for the removal of the slimy deposit and, hence, obviates the stringy or ropy condition alluded to; and it does this very probably due to the fact that such inclusions are sticky when cold and may then be readily removed as distinguished from its fluid characteristic when hot in which state it readily slips through the filter media and causes stringy or ropy milk. Aside from this pre-heating is objectionable because its effect is to dissolve and disseminate the contained dirt and other deleterious matter and to impart to the milk a very definite high odor and off flavor. By cold trapping and filtration, say at about 40° F., it is possible readily to remove dirt and other objectionable matter, including those slimy deposits resulting from mastitis or garget which deposits themselves are loosely termed garget by farmers and others on the farms and other bacterial cultures, before the milk enters the processing lines because dirt, in cold milk, is substantially dormant and if removed in the cold state will leave the milk pure and wholesome.

The elimination of dirt and bacteria cultures at the dump tanks by cold filtration and before processing long has been recognized as a desirable achievement and yet, notwithstanding that the industry has given the subject considerable attention, it has not been possible heretofore and before my invention to effect the cold filtration of milk in a commercial way.

I have determined after extended experimentation that the main contributing cause of such failure is the breakdown of the filter septa resulting from clogging of the filter surfaces sometimes with the slimy discharge from cows suffering from garget and the like and more frequently with unstabilized butter fat in the form of thin flat flakes. The flakes of unstabilized butter and clumps of stabilized butter fat globules, as well as butter fat aggregates not reduced to the form of flakes or shavings, thoroughly obstruct or seal the filter and the consequence is that there is a building up of pressure sufficient to cause rupture of the cotton or equivalent filter septa. In short, I have determined that the breakdown of the filter septa may be attributed in part to the presence, in whole milk held at low temperatures, of large clumps of stabilized butter fat globules and butter fat aggregates. Generally speaking, the aggregate or agglomerated phase is due to several factors—agitation of the milk during transportation, the temperature at which it is held, and the period of its storage. The butter fat problem is also aggravated by the action of the pump which usually is of the rotary positive displacement type operating at constant speed without pulsation or irregular action. The pump has a decided shearing and crushing action upon the stabilized butter fat, the effect of which is to disperse the aggregates in the form of thin flat flakes having unstable fatty surfaces which exert an immediate and complete detrimental film sealing of the filter media. The filter is obstructed still more by the clumps of stabilized butter fat globules and by the butter fat aggregates that happen to escape the flaking action of the pump and yet are still of the order of magnitude not to be passed by the filter.

Exhaustive tests were conducted with other types of standard pumps but the ultimate result was the same, viz., the objectionable flaking before alluded to. Nor did the use of standard strainers on the input or output side of the pump operate to lessen the problem to any appreciable degree. Standard woven wire strainers failed of their purpose because they rapidly succumbed to deformation, were difficult to clean and permitted too much viscosity of flow so that the bodies in suspension instead of being trapped by the strainers were forced through the openings thereof along with the milk.

I then centered my efforts on a method and means for trapping the film forming matter, including flakes and other forms of butter fat obstructing media, and evolved a trap that completely solved the problem and met with instant acclaim by the dairy industry. In the preferred practice of the invention it is interposed in the line between the output side of the pump and the filter septa. Briefly stated, the trapping device comprises a plurality of screens in the form of perforated metal sheets or disks so ordered and arranged that the milk traverses them without bypassing. The screens are uniformly punched with a multiplicity of relatively minute openings somewhat of the nature of pinholes. In addition to such basic openings, successive screens with the exception of the final one in ascending order, that is to say, as they occur in the direction of fluid flow towards the filter, are provided with relatively large ports or openings to insure uninterrupted flow should a particular screening area become clogged. The foraminous screens are concentrically crimped or corrugated which gives them a bilge effect and a co-mated arrangement that greatly augments the effective trapping area, and stiffens or imparts a certain degree of rigidity to the light gage metal whereof the plates are constructed while yet conferring or retaining enough resiliency to the end that the screens while under stress of fluid flow will be expanded in a radial direction and thereby assume a snug sliding fit on the inner wall of the casing for the purpose and with the result of preventing edgewise or circumferential bypassing of the milk. The described construction and arrangement of the screens has the further merit that it provides for self-spacing in the sense that they mutually serve to space themselves and thus obviate the use of independent separators which are objectionable because they are not sanitary and because they obstruct fluid flow. The described construction and arrangement is further meritorious because it develops a swirling action of the milk which keeps the particles in a state of substantially constant motion thereby tending to prevent them from adhering to the screening surfaces with the result of greatly prolonging the useful life of the screen. The swirling action also operates to gather the flakes into pellet form which facilitates the cleaning of the screening surfaces.

Generally stated the invention comprehends the obviating of conditions tending to mechanical breakdown of filter septa in the commercial or power filtration of milk, that is to say, where the raw milk is delivered under constant flow and pressure from a pump to a filter head, which improvement consists in separating out from the milk, at a point in the feed line between the pump and the filter head, slimy bacterial matters, unstabilized butter fat, and other inclusions of such nature as surely to clog and break down the filter septa, and effecting such separating out or removal of the clogging matters while they are still in a dormant state and in suspension, that is to say, while the milk is cold and preferably at a temperature of about 40° F. and in such way as not appreciably to interrupt the flow from the pump to the filter head.

One embodiment of the invention is illustrated in the accompanying drawings, wherein Figure 1 is an elevational view of a layout comprising a filter, a pump for supplying milk under pressure, and a line connection including means for removing filter obstructing and other objectionable or deleterious substances from the milk.

Figure 2:
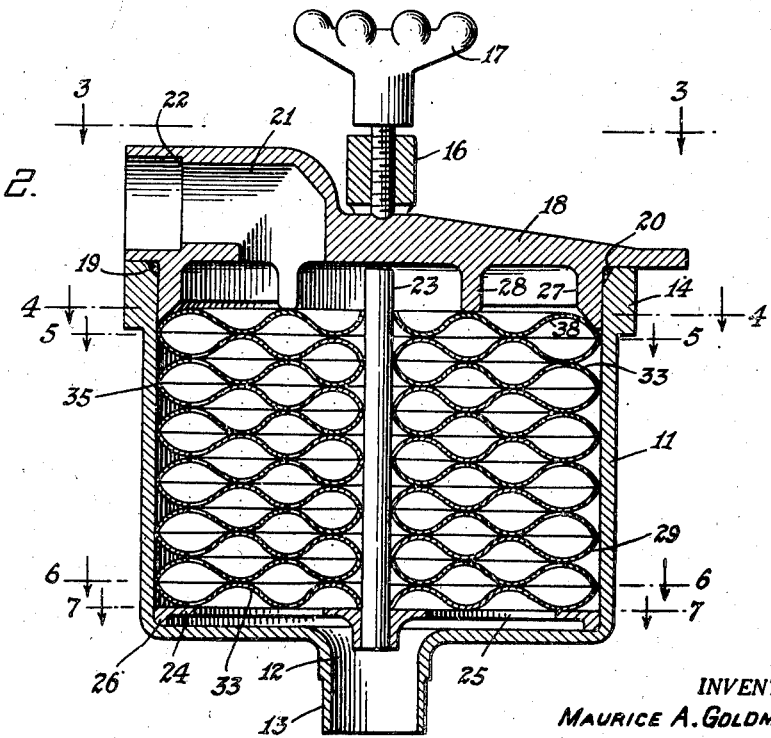

Fig. 2 is a view, somewhat enlarged, on line 2—2 of Fig. 1.

Fig. 3 is a section on line 3—3 of Fig. 2.
Fig. 4 is a section on line 4—4 of Fig. 2.
Fig. 5 is a section on line 5—5 of Fig. 2.
Fig. 6 is a section on line 6—6 of Fig. 2.
Fig. 7 is a section on line 7—7 of Fig. 2.

Referring to Fig. 1, the numeral 5 represents a cabinet serving as a housing for certain conventional control apparatus, such as pressure gages, etc., and a drive for a pump, the latter being generally indicated at 6. The cabinet supports a filter head 7 and its complemental filter elements generally indicated at 8 and releasably locked within the head. A line connection 9 between the filter and the output 10 of the pump includes a readily separable casing 11 which contains the screening elements.

Casing 11 is a generally cylindrical shell whose axial inlet 12 has a reduced portion or neck 13 to telescope the output 10 of the pump. The shell or casing has an enlarged or offset rim 14 serving as an abutment for the clamping jaws 15 of a yoke 16 which cooperates with a screw 17 to secure a removable head 18 in sealing relation with the casing, it being noted, in Fig. 2, that the rim of the casing has its inner edge formed with an angularly disposed recession 19 to accommodate a sealing gasket 20. Casing head 18 has a fluidway or outlet 21 formed with a shouldered seat 22 for telescopic engagement with the line connection of the filter. This simple construction and arrangement is meritorious because it admits of ready accessibility to the contents of the casing for inspection and cleaning or replacement, when necessary, without disturbing the filter-set-up.

Referring further to Fig. 2, which shows the complete assembly of the trap, it may be remarked that, in the absence of the casing head, and by means of a centering rod or spindle 23, the screening elements may be handled, that is to say, applied and removed as a unit. The spindle 23 is stepped in a relatively thick bottom plate 24 freely exposed to milk entering the casing and having large ports 25 (Fig. 7). In order to eliminate by-passing of the milk the periphery of the plate 24 snugly fits the inner wall of the casing and is thickened by downwardly directed continuous flange or ledge 26 whereby the plate is seated with its ports in adequate clearance relation with the bottom of the casing. The elements 29 are centered by the spindle and they, likewise, snugly fit the inner wall of the casing and the spindle so as to eliminate the hazard of bypassing of the milk. When the parts are assembled in the manner stated and the casing head is applied, its skirt 27 and web extensions 28 will bear upon appropriate parts of the topmost trapping element and thereby counteract any thrust that may be imposed upon the assembly when under stress of fluid flow.

I have obtained excellent results in practice by employing twelve foraminous screening elements such as indicated at 29 and constituted of disk shape stampings from relatively thin or light gage sheets of nickel alloy but the number of disks may be varied. The disks while still in the flat state are uniformly punched, as at 30, to provide, for example, nine hundred fifty-two holes to the square inch. They are then punched to provide two sets of ports or openings, 31 and 32, spaced on radial lines and of the order, respectively, of $17/64$ and $9/64$ of an inch, the larger apertures being outermost.

As already has been stated the screening elements are formed of relatively thin sheet metal and it is desirable to mechanically stiffen them without thickening the sheet and, hence, without increasing surface friction of the basic openings. To that end the disks are circumferentially corrugated, as at 33 to provide bulges 34. The latter provision greatly augments the effective trapping area and is also important because it obviates the use of separate or independent means for maintaining the requisite spacing between adjacent disks, the convexed portions mutually serving as separators. The reversely curved lips or edges 35 also insure self-sealing of the comated baffles and this in conjunction with the precision of their fit on the inner wall of the casing prevents bypassing of the milk.

The disks have a certain amount of inherent resiliency which is increased rather than decreased by the crimping. Hence, the crimped disks, when under pressure of the milk, have a tendency to move radially under flattening action towards the casing wall as well as the centering device and thus prevent leakage or bypassing circumferentially and axially, either or both.

As already stated, the screening elements are formed or provided with radially spaced differential ports or apertures. Their purpose is to insure uninterrupted fluid flow in the event of clogging of any one or more of the screening elements, and to that end they are definitely ordered. For example, the first screen (Fig. 6), meaning by that the one nearest the casing inlet, is provided with eleven ports 31 and eleven ports 32, the numbers of each of the respective ports diminishing by one in the ascending order of the screens so that the eleventh screen (Fig. 5) has but one of each of said ports 31 and 32, and the topmost screen has no openings other than the basic minute perforations. This construction and arrangement enables each screen to take care of a proportion of the load of unstabilized or flake butter fat; and the trapping and balling of the butter fat throughout the bilged areas is accelerated by the swirling action of the milk induced by the crimped construction of the screens and to some extent by the orderly arrangement of the differential fluid ports or escape apertures. Otherwise stated, the total area of the ports in the first screen unit is equivalent to almost five per cent of the total area of the basic or minute openings and accordingly passes about five per cent of the flow before the basic openings become clogged. Nevertheless, the escape openings are adequate to handle the entire flow in the event the screening surface becomes clogged. The total area of the escape openings in each successive stage diminishes by about one-half of one per cent because each successive trapping unit works on relatively cleaner milk and consequently the relative proportion of the total area of fine perforations to the total area of escape openings can be higher.

The arrangement of progressively diminishing port areas provides a unique arrangement of screening layers both in series and in parallel which materially increases the capacity of the trapping device. It will be noted that while the liquid is being screened through the layer which is first in the direction of flow, some of the liqud carrying entrained solids passes through the ports to be screened through the second layer simultaneously. In turn while liquid is being screened by the second layer a portion passes through the ports to be screened by the third layer and so on to the end of the series. This arrangement of the layers in parallel allows all layers (except the final one) to screen liquids simultaneously materially increasing the rate of flow of the capacity of the trapping device. However some of the liquid which passes through the perforate portion of the first screen and thereby has solids removed from it may pass successively through the perforate portions of the second and third screens and so on, and in any event the liquid is screened by the last screen of the series which has no ports. Thus liquid is screened through a plurality of layers successively or in series.

Paradoxically the swirling action of the milk defers clogging of the minute openings because it operates to keep the particles to be trapped in substantially a constant state of motion and this materially aids in washing or cleaning the screening surfaces.

It may be remarked that the layout was operated under commercial conditions and after the lapse of the usual time for the calibrated capacity of the filter, the filter septa and trap were removed. The filter was unbroken, showed no evidence of collapse or rupture, and was entirely free from deposit of butter fat and other substances. In short, its usefulness was substantially unimpaired. The trap screens showed an even distribution of flaky fat and other trapped substances.

I claim:

1. Apparatus for trapping foreign matter from fluids, said apparatus comprising a casing having an inlet and an outlet, a plurality of superimposed perforated corrugated disks positioned in said casing between said inlet and said outlet, said disks being arranged in contact with each other and in pairs with the corrugations of each pair being reversed in direction whereby the disks will be spaced in accordance with the depth of the corrugations and may expand radially upon the application of pressure and when so expanded will engage the sides of said casing.

2. Apparatus for removing solids from liquids comprising in combination a chamber having an inlet, an outlet, and a plurality of circumferentially corrugated disks arranged in series between said inlet and outlet, each of said disks being formed of material adapted to prevent the passage of solids through it, but having passages permitting the flow of liquids through it, the corrugations of adjacent disks being reversed to space the major portion of each disk from the adjacent disks when the disks are in contact, each of the disks except the last of the series in the direction of flow of liquid being provided with one or more openings in addition to said passages permitting the passage of liquids and solids, whereby the liquid passes through a plurality of disks successively, and in so doing passes through a plurality of the passages and openings in said disks in parallel simultaneously.

3. Apparatus for removing solids from liquids comprising in combination a chamber having an inlet, an outlet, and a plurality of spaced pervious screens arranged in series within said chamber and each fitted to the wall of the container and obstructing passage between the inlet and outlet, each of said screens being formed of material adapted to prevent the passage of solids through it and having passages permitting the flow of liquids only through it and each of the screens, except the last in the direction of flow of liquid being provided with one or more additional openings larger than said liquid passages permitting the passage of liquids and solids whereby liquid in passing through said chamber passes through a plurality of said screens and in so doing, passes through a plurality of said passages and a plurality of said openings simultaneously, the total area of said openings, in each screen having such openings, decreasing progressively from screen to screen in the direction of flow through said chamber.

MAURICE A. GOLDMAN.

REFERENCES CITED

The following references are of record in the file of this patent:

UNITED STATES PATENTS

| Number | Name | Date |
|---|---|---|
| 405,406 | Gasquet | June 18, 1889 |
| 758,150 | Schilling | Apr. 26, 1904 |
| 794,271 | Anson | July 11, 1905 |
| 969,357 | Fredrum | Sept. 6, 1910 |
| 1,005,366 | Tousley | Oct. 10, 1911 |
| 1,061,928 | Seavey | May 13, 1913 |
| 1,172,728 | Perkins | Feb. 22, 1916 |
| 1,202,723 | Jackson | Oct. 24, 1916 |
| 1,335,087 | Bell | Mar. 30, 1920 |
| 1,737,313 | Kamrath | Nov. 26, 1929 |
| 1,790,470 | Hansen | Jan. 27, 1931 |
| 1,794,768 | Hatch | Mar. 3, 1931 |
| 1,966,274 | Wells | July 10, 1934 |
| 2,028,061 | Goldman | Jan. 14, 1936 |
| 2,044,096 | Moran | June 16, 1936 |
| 2,066,793 | Mesurac | Jan. 5, 1937 |
| 2,075,175 | Byrd | Mar. 30, 1937 |
| 2,115,577 | Goldman | Apr. 26, 1938 |
| 2,132,099 | Doering et al. | Oct. 4, 1938 |
| 2,148,100 | Browne | Feb. 21, 1939 |
| 2,151,760 | Harris | Mar. 28, 1939 |
| 2,157,668 | Kidd | May 9, 1939 |
| 2,184,243 | Belyavin | Dec. 19, 1939 |
| 2,216,646 | Mautz | Oct. 1, 1940 |

OTHER REFERENCES

Heineman, "Milk," published by W. B. Saunders Co. 1919, pp. 332–5, 462–6, 473.